(12) United States Patent
Kawarazaki et al.

(10) Patent No.: US 10,253,919 B2
(45) Date of Patent: Apr. 9, 2019

(54) VACUUM HEAT INSULATION BODY

(71) Applicant: Panasonic Intellectual Property Management Co., Ltd., Osaka-shi, Osaka (JP)

(72) Inventors: Hideji Kawarazaki, Osaka (JP); Tsuyoki Hirai, Shiga (JP); Toshiaki Hirano, Shiga (JP); Tomoaki Kitano, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/617,749

(22) Filed: Jun. 8, 2017

(65) Prior Publication Data

US 2017/0276287 A1    Sep. 28, 2017

Related U.S. Application Data

(63) Continuation of application No. PCT/JP2016/001502, filed on Mar. 16, 2016.

(30) Foreign Application Priority Data

Apr. 6, 2015 (JP) .................................. 2015-077365

(51) Int. Cl.
*F16L 59/065* (2006.01)
*F25D 23/06* (2006.01)

(52) U.S. Cl.
CPC ............ *F16L 59/065* (2013.01); *F25D 23/06* (2013.01); *F25D 23/064* (2013.01); *F25D 2201/1262* (2013.01); *F25D 2201/14* (2013.01); *Y10T 428/231* (2015.01)

(58) Field of Classification Search
CPC . Y10T 428/231; F16L 59/065; C08J 2375/04; B32B 5/20
See application file for complete search history.

(56) References Cited

U.S. PATENT DOCUMENTS

| 2004/0058119 | A1* | 3/2004 | Wynne .................. B29C 53/063 428/69 |
| 2014/0346942 | A1* | 11/2014 | Kim ...................... F25D 23/067 312/404 |
| 2015/0140244 | A1 | 5/2015 | Uekado et al. |
| 2015/0184789 | A1 | 7/2015 | Hirai et al. |

FOREIGN PATENT DOCUMENTS

| JP | 11-159693 | 6/1999 |
| JP | 5310928 B | 10/2013 |
| JP | 5310929 B | 10/2013 |

* cited by examiner

*Primary Examiner* — Alexander S Thomas
(74) *Attorney, Agent, or Firm* — Hamre, Schumann, Mueller & Larson, P.C.

(57) ABSTRACT

A vacuum insulation body includes an outer box (2), an inner box (3), open-cell urethane foam (4) in the insulation space (1b) between the outer box (2) and the inner box (3); and a vacuum outlet (6) in one of the outer box (2) and the inner box (3). The urethane foam (4) includes a through passage (8a) leading to the vacuum outlet (6). The vacuum outlet (6) is sealed after the insulation space (1b) filled with the urethane foam (4) is vacuum-evacuated.

5 Claims, 17 Drawing Sheets

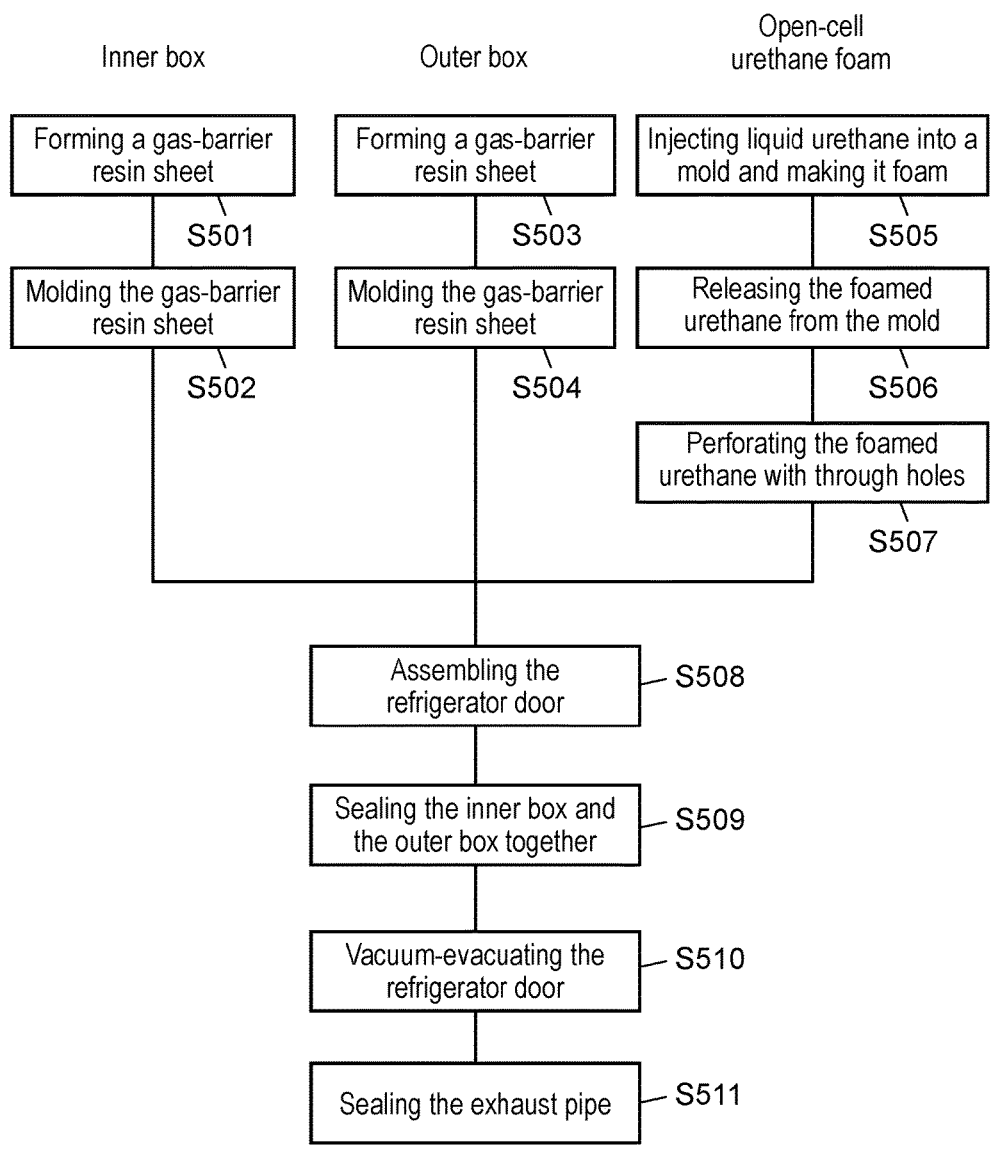

FIG. 12A
FIG. 12B
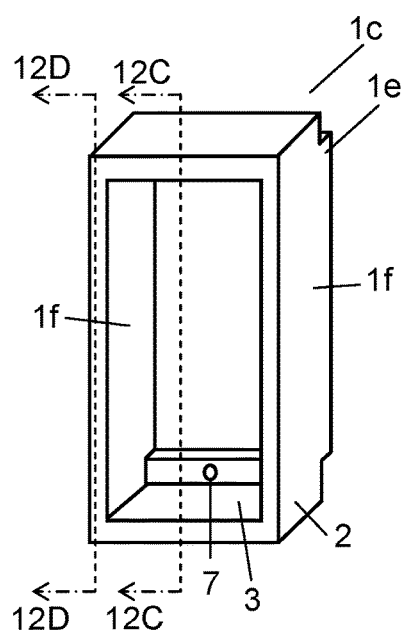
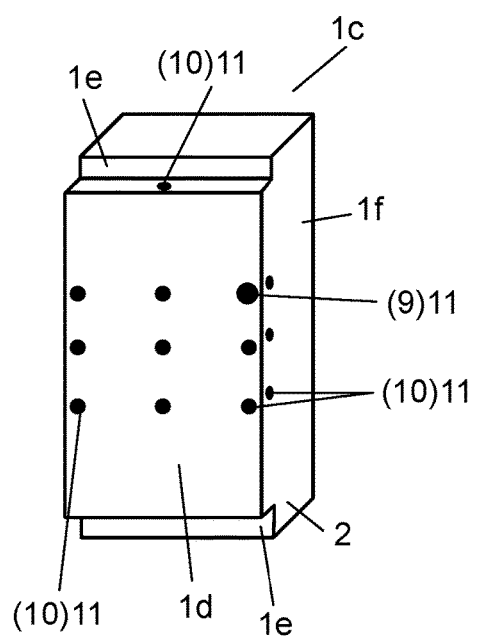

VACUUM HEAT INSULATION BODY

TECHNICAL FIELD

The present invention relates to a vacuum insulation body used in refrigerators and other similar devices.

BACKGROUND ART

There have been increasing efforts in recent years to save energy to prevent global warming, which is a global environmental issue. For example, in the case of thermal devices such as refrigerators and vending machines, it used to be common to inject closed-cell urethane foam into the insulation space between the outer and inner boxes composing the insulation box of these thermal devices. Recently, however, it is more common to provide a vacuum insulation material into the insulation space and to inject closed-cell urethane foam into the space.

A vacuum insulation material is composed of a bag-shaped gas-barrier covering material and a core made of glass wool or other similar material and sealed in the covering material under reduced pressure. Some vacuum insulation materials include a core and an adsorbent both of which are sealed under reduced pressure. Vacuum insulation materials have about 20 times better insulation performance than rigid urethane foam, and their insulation performance can be maintained even if the materials are smaller in thickness.

For these reasons, vacuum insulation materials are attracting attention as an effective means to meet customers' demand for larger-volume insulation boxes as well as to increase insulation performance to achieve energy saving.

However, the insulation spaces of insulation boxes such as refrigerators tend to have complicated shapes. This sets a limit to the increase in the covering area of a vacuum insulation material, or in other words, in the area proportion of the vacuum insulation material in the total heat transfer area of the insulation box.

To address this issue, PTL 1 proposes the following technique which does not employ vacuum insulation material. Open-cell urethane foam with a porous structure is injected into the insulation space of an insulation box first, and then the insulation box is vacuum-evacuated by a vacuum-evacuator connected to the outlet of the box. An open-cell structure is a structure where the cells are communicated with each other. In contrast, a closed-cell structure is a structure where the cells are isolated from and not communicated with each other.

When the insulation space between the outer and inner boxes of an insulation box such as a refrigerator is wholly formed into a vacuum insulation layer without using a vacuum insulation material, open-cell urethane foam is used. If closed-cell urethane foam is used instead of open-cell urethane foam, residual gas in the closed cells comes out after vacuum evacuation, causing a decrease in the degree of vacuum.

The open-cell urethane foam does not merely have an open-cell structure. It is also to have air permeability between adjacent cells both in cell film portions (membranous portions between the cells) of the urethane foam and in cell framework portions (connected to the cell film portions and thicker than these). The reason for the need of air permeability between adjacent cells is as follows. In regions with a relatively low density of cells and a high content of the resin of the open-cell urethane foam (many of the cell framework portions), it is difficult to form through-holes in the resin. As a result, the resin blocks the communication between the cells, failing to completely vacuum-evacuate the insulation space.

Open-cell urethane foam is to have air permeability between adjacent cells not only in a core layer at the center but also in a skin layer at and near the boundaries between the outer and inner boxes because the skin layer includes more of the cell framework portions than the core layer.

For example, in the open-cell urethane foam shown in PTL 1 having air permeability between adjacent cells both in the core layer and in the skin layer, the insulation space can be vacuum-evacuated.

However, the through-holes in each cell film portion and cell framework portion of the above open-cell urethane foam are as small as several microns in diameter. This causes the urethane foam as a whole to have a high evacuation resistance. As a result, it takes several hours to several days to vacuum-evacuate the insulation space of a large container such as the door or housing of a refrigerator, and it is far from commercialization.

CITATION LIST

Patent Literature

PTL 1: Japanese Patent No. 5310929
PTL 2: Japanese Patent No. 5310928

SUMMARY OF THE INVENTION

The present invention provides a vacuum insulation body containing open-cell urethane foam, which enables the vacuum insulation body to be vacuum-evacuated in a significantly shorter time.

The vacuum insulation body according to an embodiment of the present invention includes an outer box, an inner box, open-cell urethane foam in an insulation space between the outer and inner boxes, and a vacuum outlet in at least one of the outer and inner boxes. The urethane foam includes a through passage leading to the vacuum outlet. The vacuum outlet is sealed after the insulation space filled with the urethane foam is vacuum-evacuated.

With this configuration, the through passage in the open-cell urethane foam facilitates the evacuation of gas from the vacuum insulation body through the vacuum outlet, thereby greatly reducing the vacuum-evacuation time.

BRIEF DESCRIPTION OF DRAWINGS

FIG. 5 is a flowchart of the manufacture of the refrigerator door according to the first embodiment.

FIG. 12A is a front perspective view of a refrigerator housing including the vacuum insulation body according to the second embodiment of the present invention.

FIG. 12B is a rear perspective view of the refrigerator housing including the vacuum insulation body according to the second embodiment of the present invention.

DESCRIPTION OF EMBODIMENTS

Figure 1:
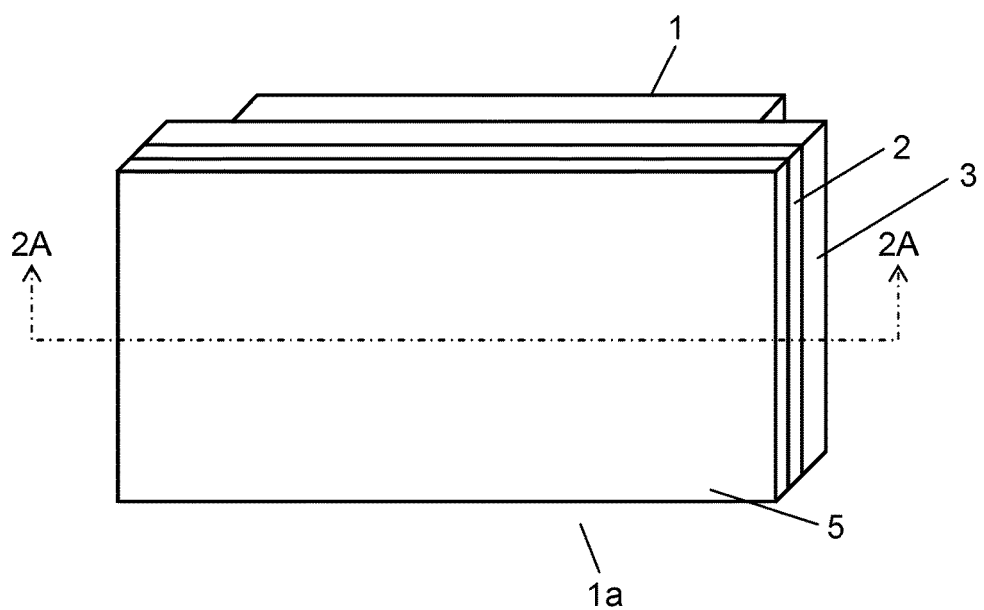
FIG. 1 is a perspective view of a refrigerator door including a vacuum insulation body according to a first embodiment of the present invention.

Embodiments of the present invention will now be described with reference to the accompanying drawings. In these drawings, the same or equivalent components are denoted by the same reference numerals, and these components may not be described more than once. The present invention is not limited to these embodiments.

First Exemplary Embodiment

Figure 2A:
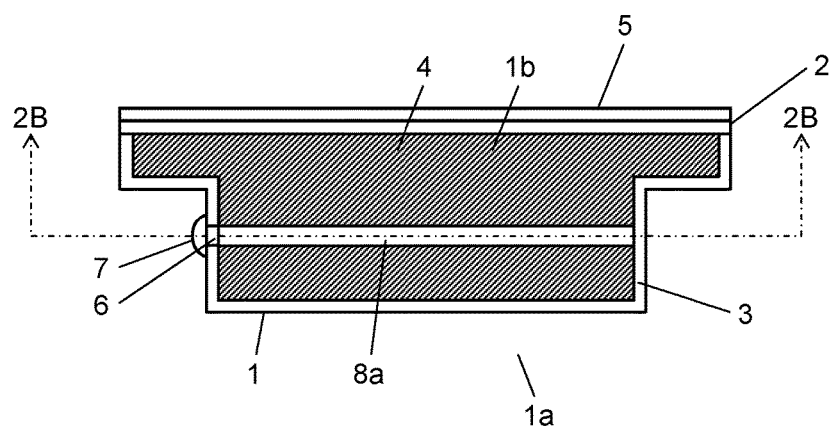
FIG. 2A is a sectional view of the refrigerator door taken along line 2A-2A of FIG. 1.

FIG. 1 is a perspective view of refrigerator door 1a including vacuum insulation body (hereinafter, box-shaped vacuum insulation body will be also referred to as vacuum insulation box) 1 according to a first embodiment of the present invention. FIG. 2A is a sectional view of refrigerator door 1a taken along line 2A-2A of FIG. 1, and FIG. 2B is a sectional view of refrigerator door 1a taken along line 2B-2B of FIG. 2A.

As shown in FIG. 2A, vacuum insulation body 1 according to the present embodiment has a box shape (hereinafter referred to as either "vacuum insulation body 1" or "vacuum insulation box 1"). Refrigerator door 1a includes vacuum insulation box 1 and exterior part 5, which is on the surface of refrigerator door 1a and is made, for example, of glass or metal. Vacuum insulation box 1 includes outer box 2 made of a gas-barrier material, inner box 3 also made of a gas-barrier material, and open-cell urethane foam 4 (the core of the vacuum insulation layer) contained in insulation space 1b between outer box 2 and inner box 3.

Inner box 3 includes vacuum outlet 6, and open-cell urethane foam 4 is perforated with through hole 8a as a through passage leading from vacuum outlet 6.

Figure 2B:
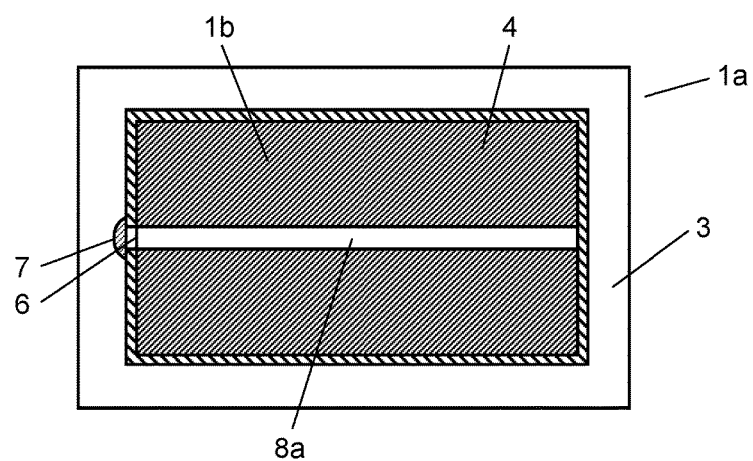
FIG. 2B is a sectional view of the refrigerator door taken along line 2B-2B of FIG. 2A.
Figure 3A:
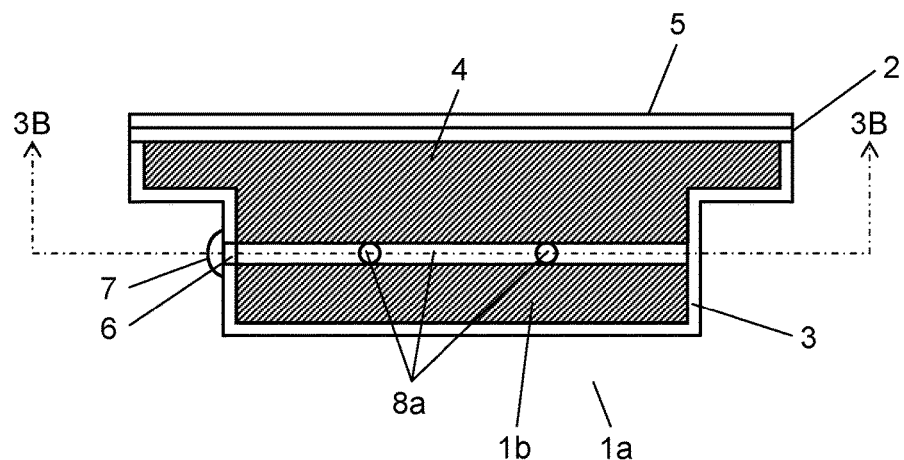
FIG. 3A is a sectional view of the refrigerator door taken along line 2A-2A of FIG. 1 according to the first embodiment of the present invention when the refrigerator door has another arrangement of through holes.
Figure 3B:
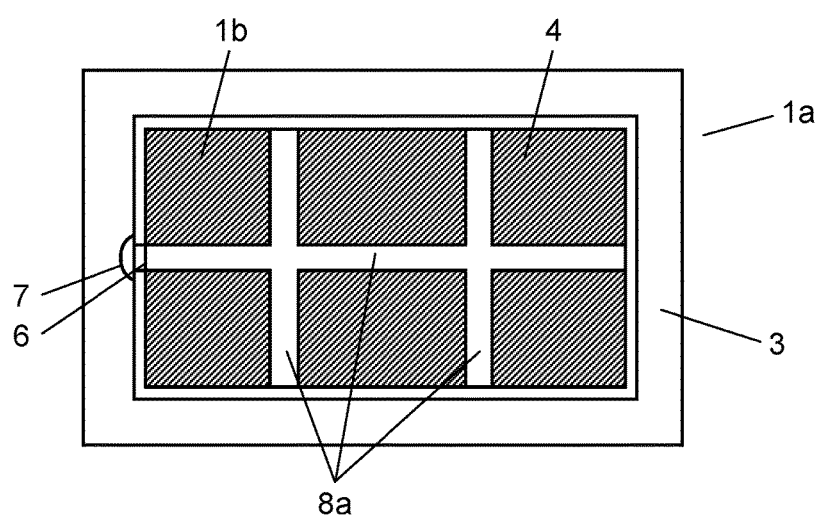
FIG. 3B is a sectional view of the refrigerator door taken along line 3B-3B of FIG. 3A.
Figure 4A:
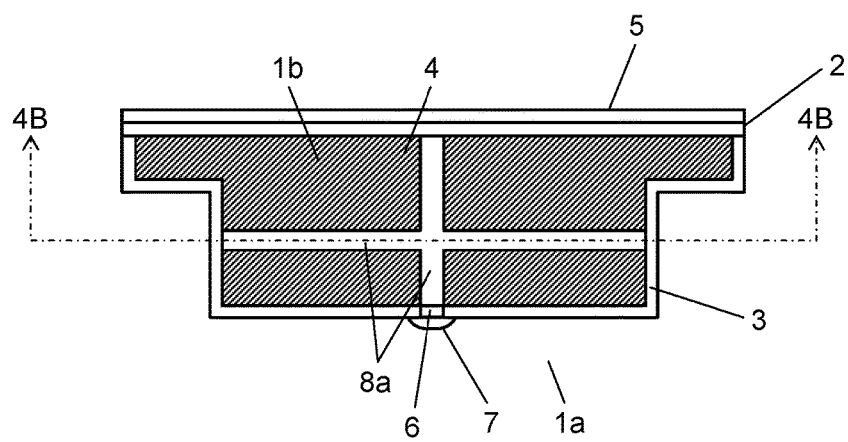
FIG. 4A is a sectional view of the refrigerator door taken along line 2A-2A of FIG. 1 according to the first embodiment of the present invention when the refrigerator door has still another arrangement of through holes.
Figure 4B:
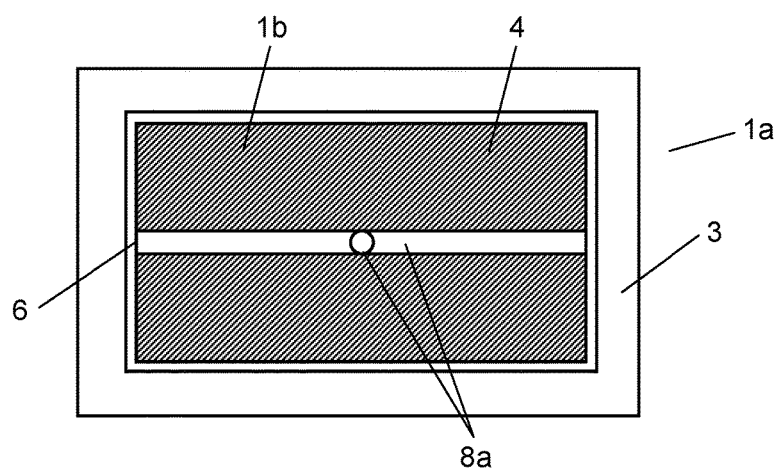
FIG. 4B is a sectional view of the refrigerator door taken along line 4B-4B of FIG. 4A.

Open-cell urethane foam 4 may be perforated with a single through hole 8a extending horizontally as shown in FIGS. 2A and 2B. Alternatively, open-cell urethane foam 4 may be perforated with two or more through holes 8a: one extending horizontally and two extending vertically as shown in FIGS. 3A and 3B, or one extending horizontally and one extending along the depth (thickness) of vacuum insulation box 1 as shown in FIGS. 4A and 4B.

In a finished product of refrigerator door 1a including vacuum insulation box 1, vacuum outlet 6 is sealed after insulation space 1b filled with open-cell urethane foam 4 is vacuum-evacuated.

A method of manufacturing refrigerator door 1a including vacuum insulation box 1 according to the first embodiment will now be described with reference to FIG. 5.

First, the manufacture of inner box 3 will be described as follows. Inner box 3 is made of a material with high gas-barrier properties and has low permeability especially to air and water vapor. Examples of the material with low gas permeability (gas-barrier material) include ethylene-vinyl alcohol copolymers and liquid crystal polymers. Examples of the material with low water-vapor permeability include polypropylenes and polyethylenes. When further containing metal foil as a material, inner box 3 more surely prevents the permeation of air and water vapor. These gas-barrier materials are formed into a single or multilayered sheet (S501), and the sheet is molded into inner box 3 (S502).

For example, a multilayer resin that is composed of an ethylene-vinyl alcohol polymer sandwiched between polypropylene layers is formed into a sheet or film as a primary process, and is then vacuum- or pressure-formed as a secondary process.

To make inner box 3 strong enough in refrigerator door 1a, the secondary-processed product is inserted inside a polypropylene injection-molded container to form inner box 3. Inner box 3 includes vacuum outlet 6 and exhaust pipe 7 for connecting vacuum outlet 6 to a vacuum pump.

Exhaust pipe 7 in the present embodiment is made of polypropylene, as the injection-molded container is, but may alternatively be made of metal or glass.

Vacuum outlet 6 and exhaust pipe 7 have inner diameters in the range of 1 to 10 mm, inclusive in the present embodiment because the larger their inner diameters, the more difficult to seal these openings. Open-cell urethane foam 4 has so high an evacuation resistance as to control the vacuum-evacuation time of the entire vacuum insulation box 1. Therefore, even when the diameters of vacuum outlet 6 and exhaust pipe 7 are as small as 1 to 10 mm, the efficiency at which vacuum insulation box 1 is evacuated can be maintained.

Meanwhile, outer box 2 is made of a material with high gas-barrier properties, like inner box 3. When used in refrigerator door 1a, outer box 2 is composed of flat surfaces, and therefore can be made of a resin laminated film or sheet containing a metal layer.

The gas-barrier resin laminated film or sheet used as outer box 2 can be formed (S503) as follows. The laminated film or sheet can be composed of an outer layer, a middle layer, and an inner layer. The outer layer is a polyethylene terephthalate layer functioning as a protective member. The middle layer is an aluminum foil layer made of a gas-barrier material. The inner layer is a polypropylene layer functioning as an adhesive layer to be bonded with inner box 3. The resin laminated film or sheet with this configuration is cut into the size of outer box 2, and then molded (S504).

Next, liquid urethane is injected into a metal mold with the shape of insulation space 1b between outer box 2 and inner box 3 of open-cell urethane foam 4, made to foam (S505), and released from the mold (S506).

Figure 6A:
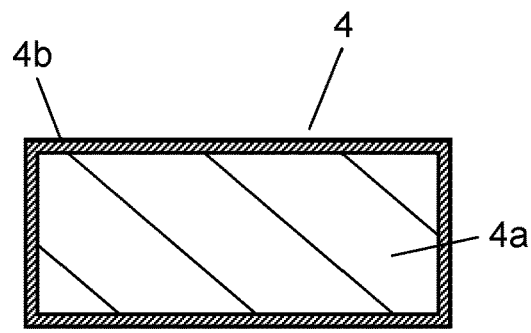
FIG. 6A is a schematic configuration view of open-cell urethane foam according to first and second embodiments of the present invention.
Figure 6B:
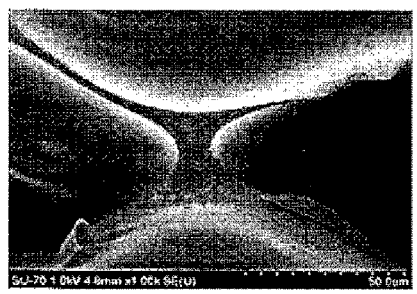
FIG. 6B is a micrograph of at least one pair of opposing cells of the open-cell urethane foam shown in FIG. 6A.
Figure 6C:
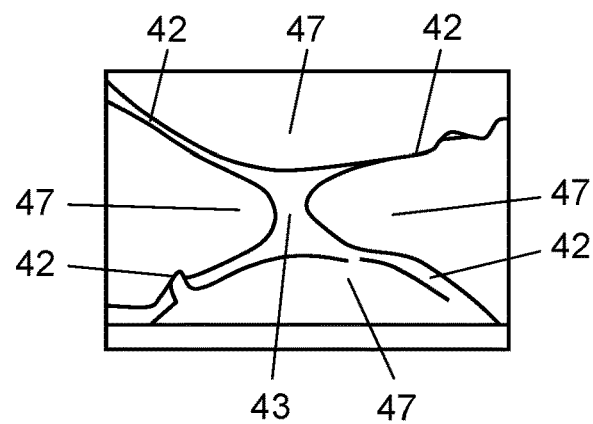
FIG. 6C is a schematic diagram of the configuration of cells of the open-cell urethane foam shown in FIG. 6B.
Figure 6D:
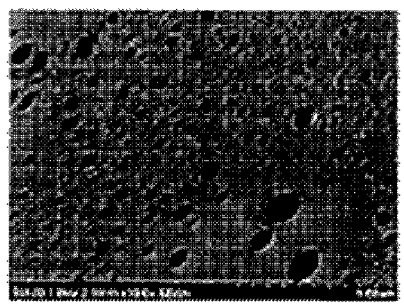
FIG. 6D is a micrograph of a cell film portion in the open-cell urethane foam shown in FIG. 6A.
Figure 6E:
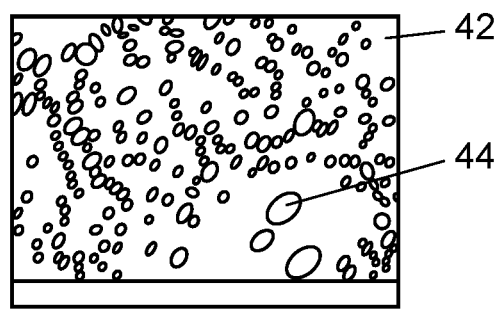
FIG. 6E is a schematic diagram of the configuration of the cell film portion in the open-cell urethane foam shown in FIG. 6D.
Figure 6F:
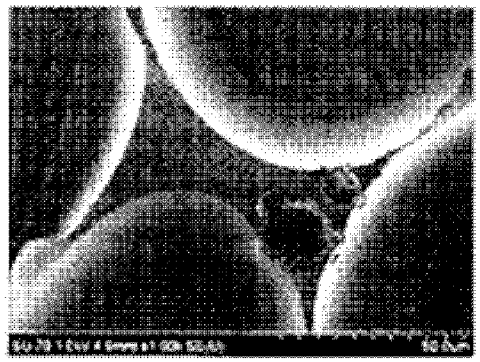
FIG. 6F is a micrograph of the open-cell urethane foam shown in FIG. 6A where the cell framework portion is shown in detail.
Figure 6G:
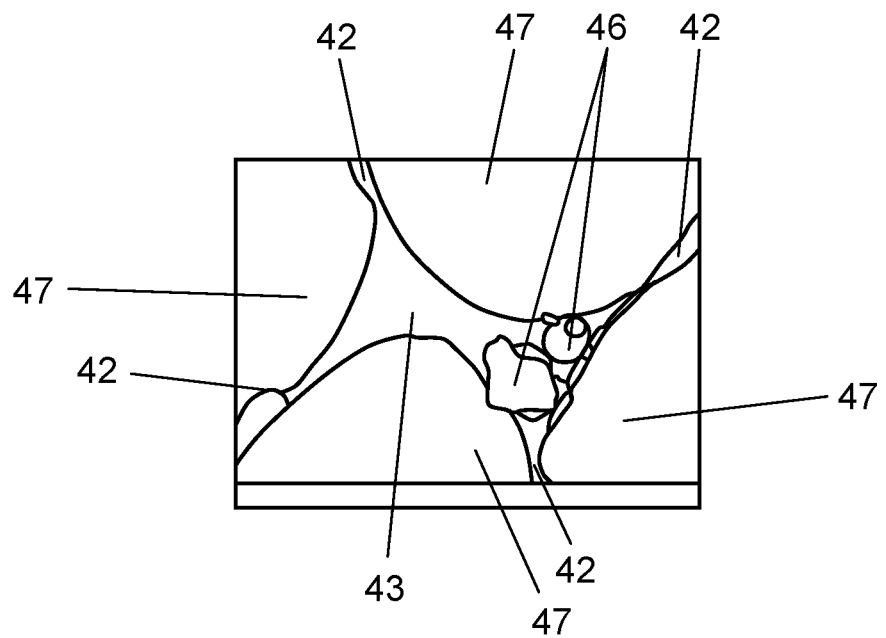
FIG. 6G is a schematic diagram of the configuration of the cell framework portion of the open-cell urethane foam shown in FIG. 6F.
Figure 6H:
FIG. 6H is a micrograph of a through-hole, which is made by using fine powder, in a cell framework portion between at least one pair of opposing cells of the open-cell urethane foam shown in FIG. 6F.
Figure 6I:
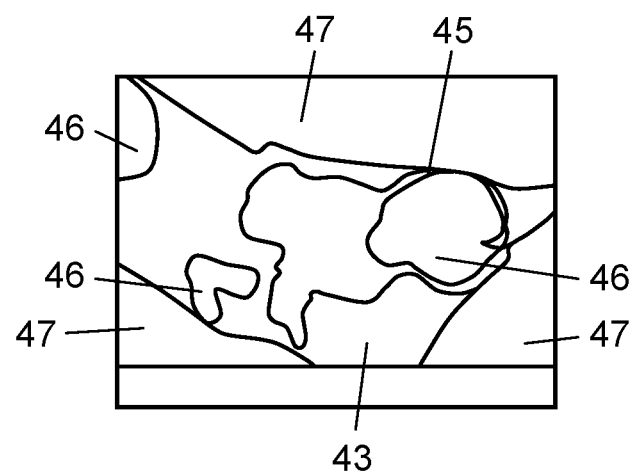
FIG. 6I is a schematic diagram of the configuration of the cell framework portion shown in FIG. 6H, which is perforated with the through-hole.

FIG. 6A is a schematic configuration view of open-cell urethane foam 4. FIG. 6B is a micrograph of at least one pair of opposing cells of open-cell urethane foam 4 shown in FIG. 6A. FIG. 6C shows the configuration of cells of open-cell urethane foam 4 shown in FIG. 6B. FIG. 6D is a micrograph of a cell film portion in open-cell urethane foam 4 shown in FIG. 6A. FIG. 6E shows the configuration of the cell film portion in the urethane foam shown in FIG. 6D. FIG. 6F is a micrograph of a through-hole (second through-hole), which is made by using fine powder, in a cell framework portion between at least one pair of opposing cells of the urethane foam shown in FIG. 6A. FIG. 6G shows the configuration of the cell framework portion of the urethane foam shown in FIG. 6F. FIG. 6H is a micrograph of open-cell urethane foam 4 shown in FIG. 6F where the cell framework portion is shown in detail. FIG. 6I shows the configuration of the cell framework portion of the urethane foam shown in FIG. 6H.

As shown in FIG. 6A, open-cell urethane foam 4 includes core layer 4a and skin layer 4b, which covers core layer 4a. Skin layer 4b is a core (urethane foam) layer with thick resin (insufficiently expanded) formed at and near the boundaries with the wall of the mold during foaming.

Open-cell urethane foam 4 has a high porosity (e.g., 95%) as shown in FIGS. 6B and 6C. Open-cell urethane foam 4 contains cells 47 and cell film portions 42, which are membranous portions between at least one pair of opposing cells 47. Open-cell urethane foam 4 further contains cell framework portions 43. Each cell framework portion 43 is connected to the cell film portion 42 present between one of the at least one pair of opposing cells 47, and is further connected to the cell film portion 42 present between another of the at least one pair of opposing cells 47. Cell framework portions 43 are larger in thickness than cell film portions 42. The thickness of cell film portions 42 corresponds to the distance between one pair of opposing cells 47. The thickness of cell framework portions 43 corresponds to the distance between two pairs of opposing cells 47.

More specifically, the thickness of cell film portions 42 is about 3 μm as shown in FIGS. 6B and 6C, and the thickness of cell framework portions 43 is about 150 μm as shown in FIGS. 6F and 6G.

The cell framework portions 43 are included more in skin layer 4b where foam expansion is insufficient than in core layer 4a.

In regions where open-cell urethane foam 4 is expanded insufficiently, cells 47 may be dispersed in bulk resin. Even in such regions, the above definition of cell film portions 42 and cell framework portions 43 holds true. In other words, these regions are considered to be mostly composed of cell framework portions 43.

Meanwhile, the above-mentioned thicknesses indicate that a typical cell film portion 42 is where the distance between a pair of opposing cells 47 is 3 μm or less, and that a typical cell framework portion 43 is where the distance between a pair of opposing cells 47 is 150 μm or more.

To ensure air permeability between each of cells 47 of open-cell urethane foam 4, cell film portions 42 include first through-hole 44 as shown in FIGS. 6D and 6E, whereas cell framework portions 43 includes second through-hole 45 as shown in FIGS. 6H and 6I.

First through-holes 44 in cell film portions 42 are formed, for example, as a result of molecular-level distortion generated when two or more kinds of urethane powders with no affinity for each other and different in molecular weight are made to foam.

The two or more kinds of urethane powders can be, for example, a polyol mixture of a predetermined composition and polyisocyanate. They can be reacted in the presence of water or other foaming agent to form first through-holes 44. Alternatively, first through-holes 44 can be formed using calcium stearate.

Meanwhile, second through-holes 45 of cell framework portions 43 can be formed at the boundaries between fine powder 46 and cells 47 as shown in FIGS. 6H and 6I. Second through-holes 45 can be generated by mixing urethane powder with fine powder having no affinity for (unlikely to be bonded to) the urethane powder (e.g., polyethylene powder or nylon powder), and then injecting the mixture. Cells 47 have a diameter of about 100 μm, whereas fine powder 46 has a diameter of about 10 to 30 μm.

As described above, in order to form first through-holes 44 in cell film portions 42 of expanded cells 47 (FIGS. 6D and 6E), the liquid urethane to be injected is a mixture of two or more kinds of urethane powders with no affinity for each other. Furthermore, in order to form second through-holes 45 in cell framework portions 43 of expended cells 47 (FIGS. 6H and 6I), the liquid urethane to be injected is further mixed with fine powder 46, which has no affinity for the urethane powder.

The above-described open-cell urethane foam 4 is detailed in PTL 2.

As described above, open-cell urethane foam 4 generated as a result of injection, foaming, and releasing is perforated with through holes 8a in predetermined positions as shown in FIGS. 2A and 2B, FIGS. 3A and 3B, or FIGS. 4A and 4B (S507).

Through holes 8a are formed by rotating and inserting a rod with a helical or conical tip into open-cell urethane foam 4. The larger the diameter of the through holes, the shorter the vacuum-evacuation time becomes. However, too large a diameter reduces the strength of open-cell urethane foam 4, causing open-cell urethane foam 4 to be pressed and deformed around through holes 8a under the atmospheric pressure. To avoid this, the diameter of the through holes is determined according to the thickness and shape of open-cell urethane foam 4. In refrigerator door 1a according to the present embodiment, open-cell urethane foam 4 has a thickness of about 10 to 30 mm, and accordingly, the diameter of the through holes is set to 5 mm.

When two or more through holes 8a are formed as shown in FIGS. 3A, 3B, 4A, and 4B, it is preferable that at least one point of each through hole 8a should be joined together and connected to vacuum outlet 6. Through holes 8a may be replaced by through grooves 8b, which function as through passages.

Figure 7A:
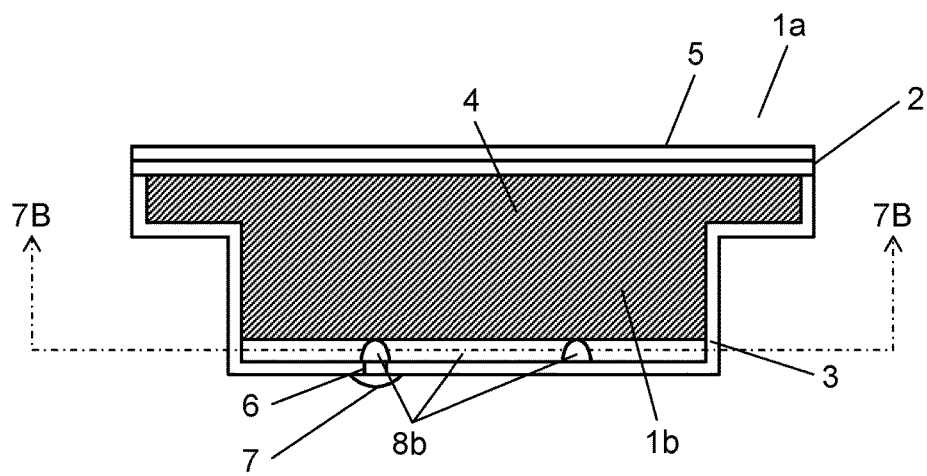
FIG. 7A is a sectional view of the refrigerator door taken along line 2A-2A of FIG. 1 according to the first embodiment when the refrigerator door has an arrangement of through grooves.
Figure 7B:
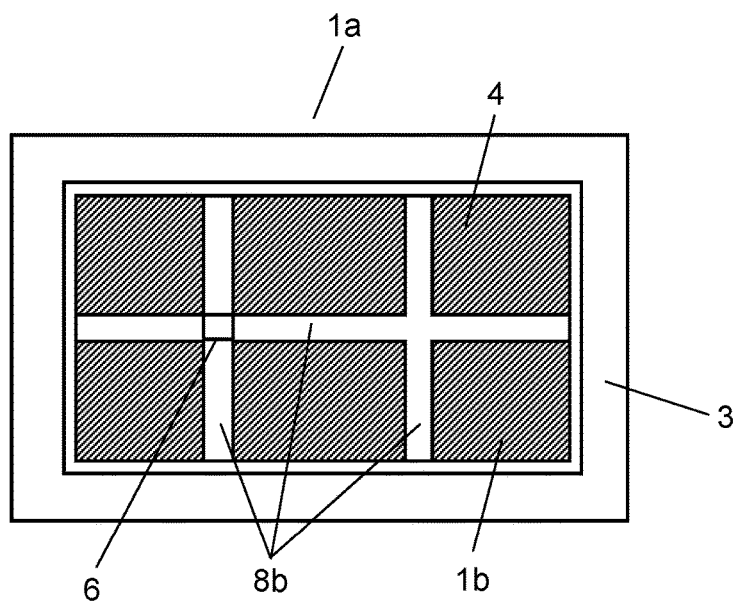
FIG. 7B is a sectional view of the refrigerator door taken along line 7B-7B of FIG. 7A.

FIG. 7A is a sectional view of refrigerator door 1a taken along line 2A-2A of FIG. 1 when refrigerator door 1a has an arrangement of through grooves 8b. FIG. 7B is a sectional view of refrigerator door 1a taken along line 7B-7B of FIG. 7A. As shown in FIGS. 7A and 7B, through grooves 8b can provide effects similar to through holes 8a. Through grooves 8b are formed in open-cell urethane foam 4 by forming projections in a metal mold into which the liquid urethane is injected. This method can omit the process of forming through holes 8a.

In FIGS. 7A and 7B, open-cell urethane foam 4 is perforated with a single through groove 8b extending horizontally along the boundaries with inner box 3 and two through grooves 8b extending vertically. Vacuum outlet 6 is formed at the intersection of the horizontal through groove 8b and one of the vertical through grooves 8b. Vacuum outlet 6 is provided with exhaust pipe 7.

As described above, a molded product of open-cell urethane foam 4 having through holes 8a or through grooves 8b is put into inner box 3, and is covered with outer box 2 to complete the assembly of refrigerator door 1a (S508). Next, the respective peripheries of inner box 3 and outer box 2 are subjected to heat and pressure to heat-seal the respective polypropylene layers of inner box 3 and outer box 2 together (S509).

Next, exhaust pipe 7 is connected to a vacuum pump to vacuum-evacuate refrigerator door 1a for a predetermined time period (S510), and then exhaust pipe 7 is sealed. Exhaust pipe 7, which is made of polypropylene as inner box 3 is, is subjected to heat, or to heat and pressure to be sealed (S511).

Although not illustrated, various gas-adsorbing agents may be disposed in vacuum insulation box 1 (in insulation space 1b) together with open-cell urethane foam 4. These agents can adsorb the gas that may remain to be vacuum-evacuated and small amounts of gas that may pass through high gas-barrier outer and inner boxes 2, 3 during long-term use. As a result, the degree of vacuum is maintained for a long time. This is a method by which vacuum insulation box 1 according to the present embodiment is manufactured.

The following is a description of how to reduce the time required to vacuum-evacuate vacuum insulation box 1 according to the present embodiment.

Figure 8:
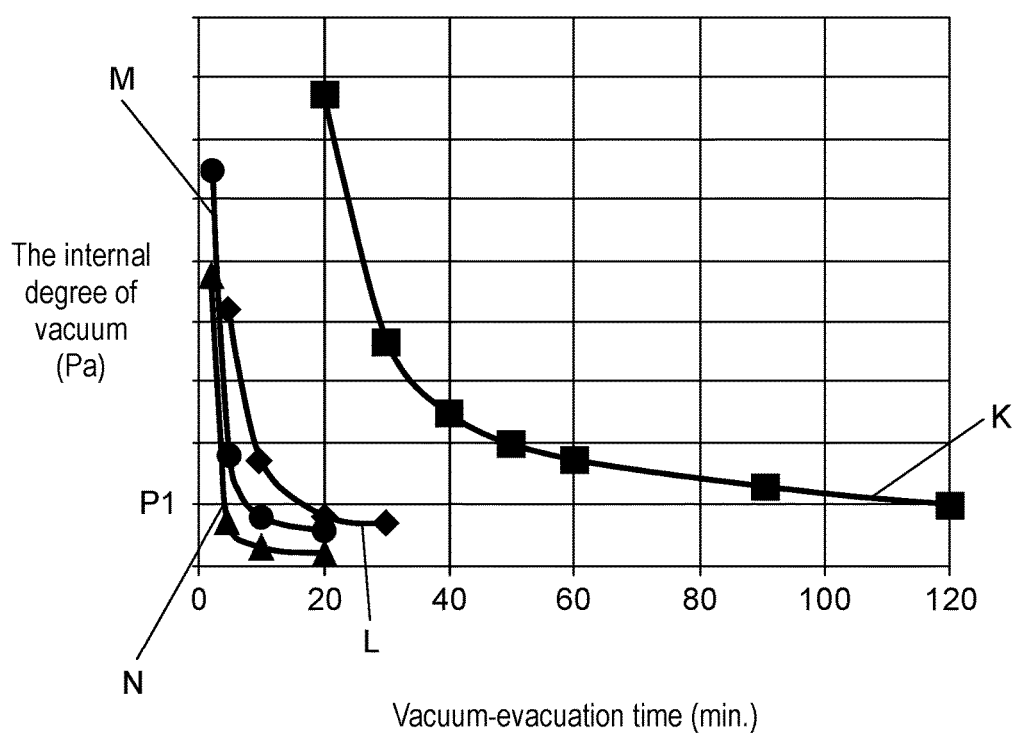
FIG. 8 is a graph showing changes in the internal pressure of the vacuum insulation body according to the first embodiment of the present invention with increasing vacuum-evacuation time.

FIG. 8 shows changes in the internal pressure of vacuum insulation box 1 perforated with a single through hole 8a (see FIGS. 2A and 2B) with increasing vacuum-evacuation time. In FIG. 8, curve K represents the case in which there is no through hole 8a, and curves L, M, and N represent the cases in which through hole 8a has a diameter of 2.0 mm, 3.0 mm, and 5.0 mm, respectively.

As understood from FIG. 8, when through hole 8a is absent (curve K), it takes 120 minutes or more for insulation space 1b to be vacuum-evacuated to reach an internal degree of vacuum (internal pressure) P1. Meanwhile, the vacuum-evacuation time can be largely reduced by perforating open-cell urethane foam 4 with through holes 8a and increasing their diameter in the order of 2.0 mm, 3.0 mm, and 5.0 mm. The vacuum-evacuation time required to reach the internal pressure P1 in the above three cases is about 20 minutes, about 10 minutes, and about 5 minutes, respectively.

As described above, vacuum insulation body (vacuum insulation box) 1 according to the present embodiment includes outer box 2, inner box 3, open-cell urethane foam 4 in insulation space 1b between outer box 2 and inner box 3, and vacuum outlet 6 in at least one of outer box 2 and inner box 3. Open-cell urethane foam 4 includes through passages (through holes 8a or through grooves 8b) leading to vacuum outlet 6. Vacuum outlet 6 is sealed after insulation space 1b filled with open-cell urethane foam 4 is vacuum-evacuated.

With this structure, open-cell urethane foam 4 is perforated with a plurality of through passages (through holes 8a or through grooves 8b) to improve the vacuum-evacuation efficiency, and hence, to further reduce the vacuum-evacuation time.

Furthermore, the through passages (through holes 8a) in open-cell urethane foam 4 can be easily formed to have a predetermined size by inserting a straight drill or a rod into open-cell urethane foam 4.

Second Exemplary Embodiment

Vacuum insulation box 1 according to a second embodiment of the present invention is identical in exterior appearance to vacuum insulation box 1 included in refrigerator door 1a according to the first embodiment shown in FIG. 1.

Figure 9A:
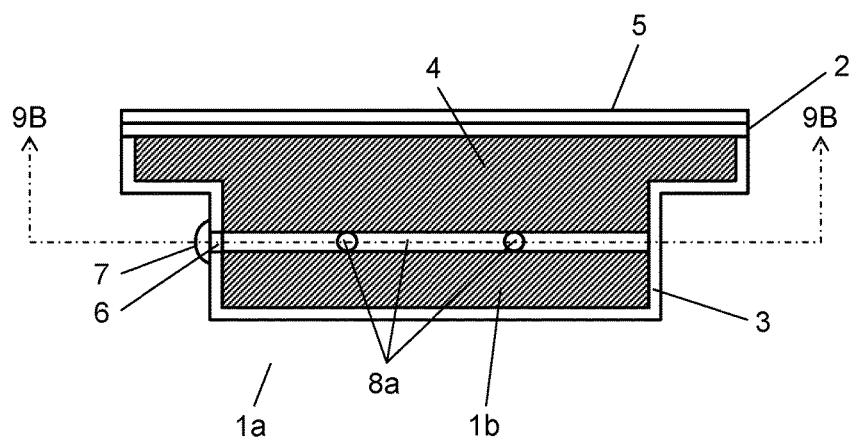
FIG. 9A is a sectional view of the refrigerator door taken along line 2A-2A of FIG. 1 having the vacuum insulation body according to the second embodiment of the present invention.
Figure 9B:
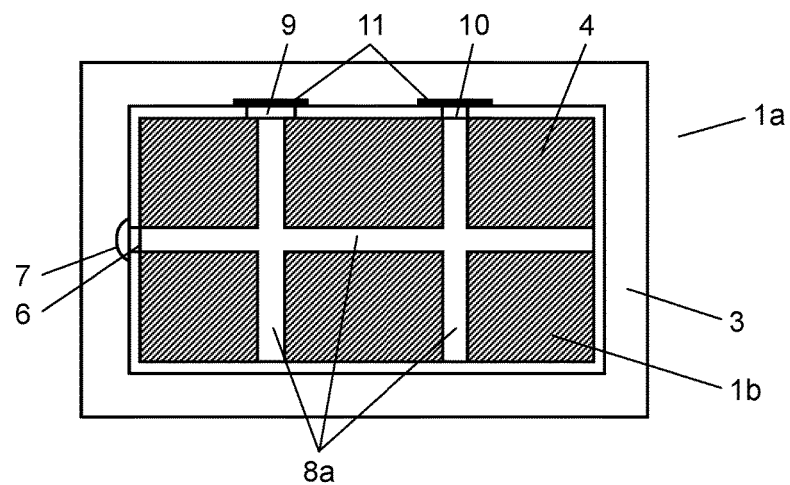
FIG. 9B is a sectional view of the refrigerator door taken along line 9B-9B of FIG. 9A.

FIG. 9A is a sectional view of refrigerator door 1a including vacuum insulation box 1 according to the present embodiment taken along line 2A-2A of FIG. 1. FIG. 9B is a sectional view of refrigerator door 1a taken along line 9B-9B of FIG. 9A.

In the present embodiment, open-cell urethane foam 4 is made to foam at once inside vacuum insulation box 1. Similar to the first embodiment, vacuum insulation box 1 according to the present embodiment includes outer box 2 made of a gas-barrier material, inner box 3 also made of a gas-barrier material, and open-cell urethane foam 4 (the core of the vacuum insulation layer) in insulation space 1b between outer box 2 and inner box 3.

As shown in FIGS. 9A and 9B, inner box 3 includes vacuum outlet 6, and open-cell urethane foam 4 is perforated with through holes 8a, which function as through passages from vacuum outlet 6. One of the through holes 8a extends horizontally and the other two of them extend vertically. Inner box 3 includes liquid urethane inlet 9 and air hatch 10, which are connected to through holes 8a. It is also possible to form a plurality of liquid urethane inlets 9 and a plurality of air hatches 10 when needed.

In a finished product of refrigerator door 1a including the above-described vacuum insulation box 1, each of vacuum outlet 6, liquid urethane inlet 9, and air hatch 10 is sealed after insulation space 1b filled with open-cell urethane foam 4 is vacuum-evacuated.

Figure 10A:
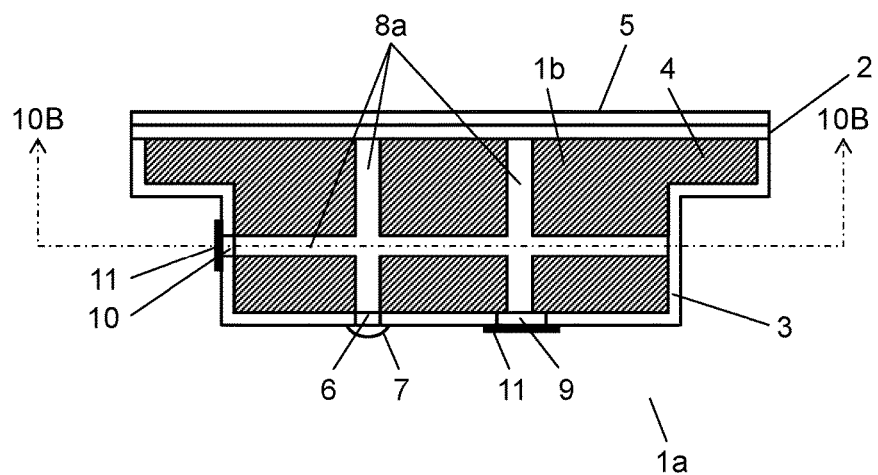
FIG. 10A is a sectional view of the refrigerator door taken along line 2A-2A of FIG. 1 according to the second embodiment of the present invention when the refrigerator door has another arrangement of through holes.
Figure 10B:
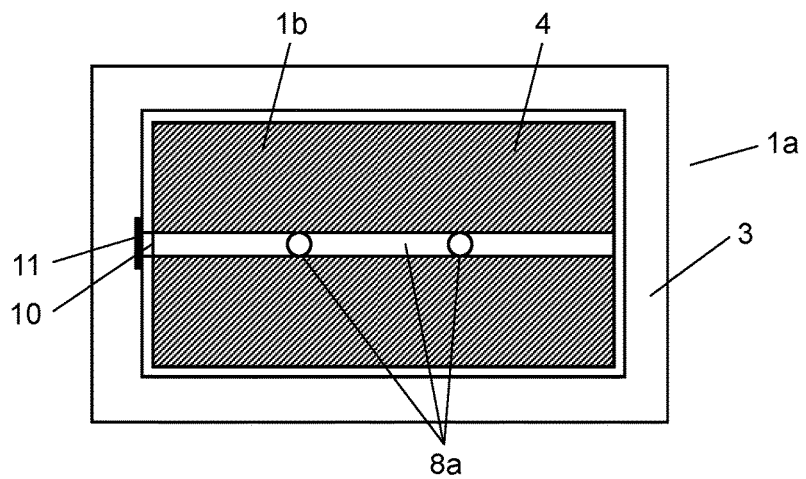
FIG. 10B is a sectional view of the refrigerator door taken along line 10B-10B of FIG. 10A.

FIGS. 10A and 10B show another arrangement of through holes 8a according to the present embodiment. FIG. 10A is a sectional view of refrigerator door 1a taken along line 2A-2A of FIG. 1. FIG. 10B is a sectional view of refrigerator door 1a taken along line 10B-10B of FIG. 10A.

In FIGS. 10A and 10B, open-cell urethane foam 4 is perforated with a single through hole 8a extending horizontally and two through holes 8a extending along the depth (thickness) of vacuum insulation box 1. In this case, too, liquid urethane inlet 9 and air hatch 10 are connected to through holes 8a. Other configurations than through holes 8a are identical to those of vacuum insulation box 1 shown in FIGS. 9A and 9B.

In the present embodiment, like the first embodiment, through holes 8a can be replaced by through grooves 8b, which function as through passages.

A method of manufacturing refrigerator door 1a including vacuum insulation box 1 according to the present embodiment will now be described with reference to FIG. 11.

Figure 11:
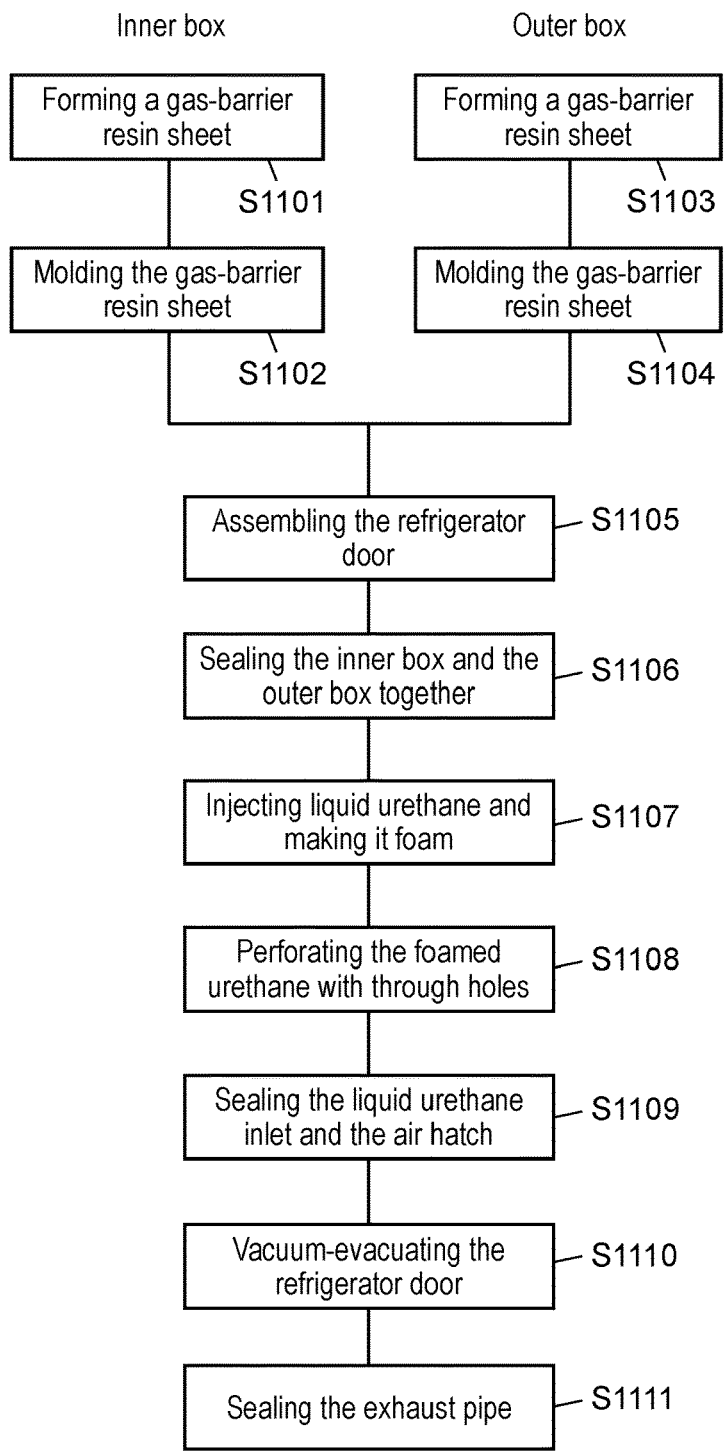
FIG. 11 is a flowchart of the manufacture of the refrigerator door according to the second embodiment of the present invention.

In FIG. 11, Steps S1101 and S1102 of the manufacturing process of inner box 3 are identical to Steps S501 and S502, respectively, of the first embodiment shown in FIG. 5. Inner box 3 of vacuum insulation box 1 according to the present embodiment includes liquid urethane inlet 9 and air hatch 10 in addition to the components of vacuum insulation box 1 according to the first embodiment. In the present embodiment, liquid urethane inlet 9 has an inner diameter of 10 to 30 mm, whereas air hatch 10 has an inner diameter of 1 to 10 mm. Unlike vacuum outlet 6, liquid urethane inlet 9 includes no pipe and is a simple hole formed in inner box 3. Liquid urethane inlet 9 and air hatch 10 may also be served as vacuum outlet 6.

In FIG. 11, Steps S1103 and S1104 of the manufacturing process of outer box 2 are identical to Steps S503 and S504, respectively, of the first embodiment shown in FIG. 5. After inner box 3 and outer box 2 are prepared, inner box 3 is covered with outer box 2 to complete the assembly of refrigerator door 1a (S1105). The respective peripheries of boxes 3 and 2 are subjected to heat and pressure to heat-seal the respective polypropylene layers of boxes 3 and 2 together (S1106).

Next, liquid urethane is injected through liquid urethane inlet 9. Open-cell urethane foam 4 is expanded inside insulation space 1b, letting air to go out through air hatch 10 to prevent the occurrence of trapped air (where urethane failed to foam sufficiently) (S1107). The liquid urethane is made of the same material as in the first embodiment.

Next, the foamed urethane is perforated with through holes 8a in predetermined positions as shown in FIGS. 9A and 9B or FIGS. 10A and 10B, (S1108). Through holes 8a are formed by rotating and inserting a rod with a helical or conical tip into open-cell urethane foam 4 through vacuum outlet 6, liquid urethane inlet 9, and air hatch 10.

After the formation of through holes 8a, liquid urethane inlet 9 and air hatch 10 are sealed (S1109). The sealing is performed with sealing member 11, which can be, for example, the same resin laminated film or sheet containing a metal layer as the one used in outer box 2. The film or sheet is heat-sealed. In the case of disposing a gas-adsorbing agent, the agent is inserted through liquid urethane inlet 9 and air hatch 10, which are then sealed with sealing member 11.

Next, exhaust pipe 7 is connected to a vacuum pump to vacuum-evacuate refrigerator door 1a for a predetermined time period (S1110), and then exhaust pipe 7 is sealed (S1111). Exhaust pipe 7, which is made of polypropylene as inner box 3 is, is subjected to heat, or to heat and pressure to be sealed.

As described above, vacuum insulation box 1 according to the present embodiment is completed.

Figure 12C:
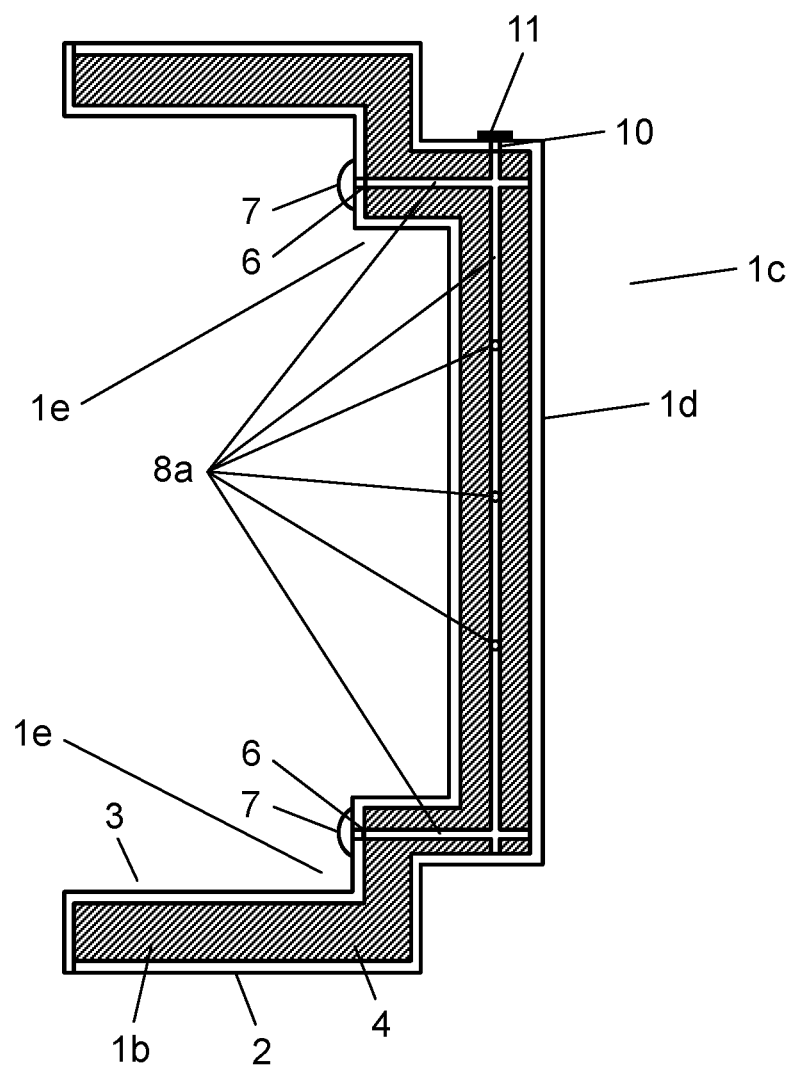
FIG. 12C is a sectional view of the refrigerator housing taken along line 12C-12C of FIG. 12A.
Figure 12D:
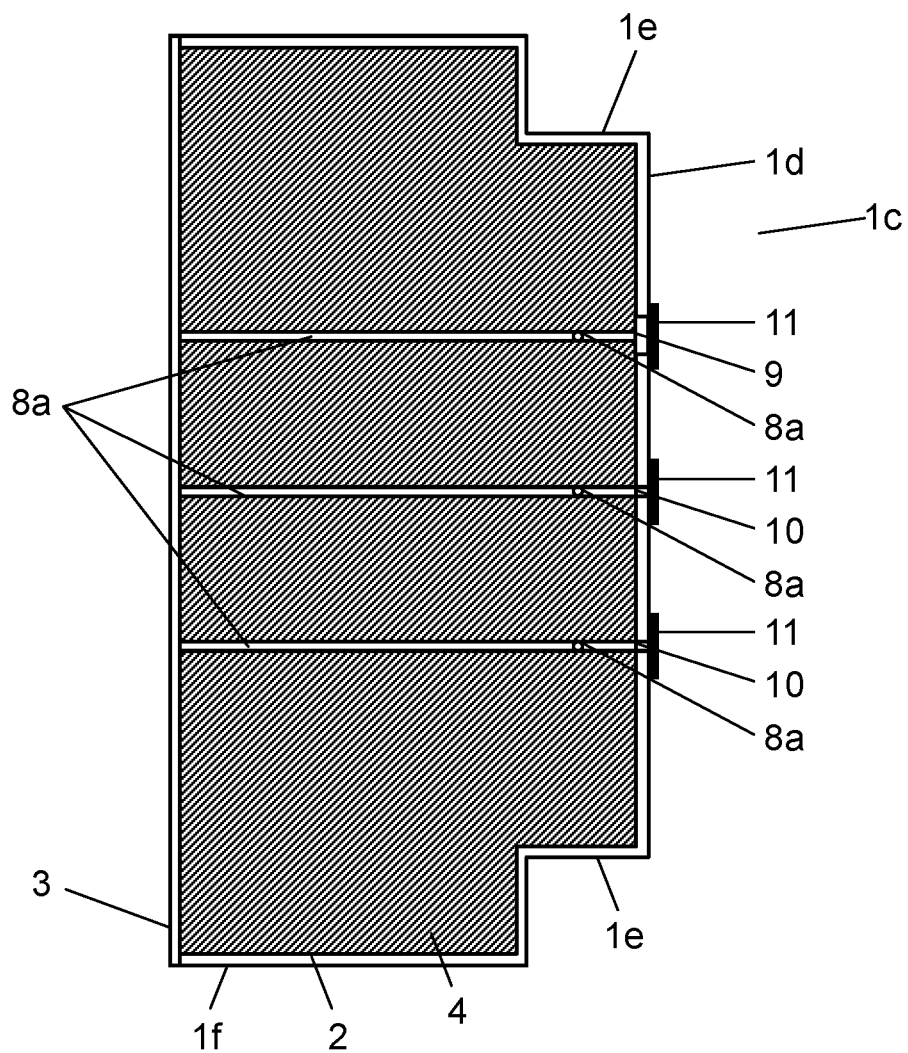
FIG. 12D is a sectional view of the refrigerator housing taken along line 12D-12D of FIG. 12A.

FIGS. 12A and 12B are a front perspective view and a rear perspective view, respectively, of refrigerator housing 1c including vacuum insulation box 1 according to the present embodiment. FIG. 12C is a sectional view of refrigerator housing 1c taken along line 12C-12C of FIG. 12A. FIG. 12D is a sectional view of refrigerator housing 1c taken along line 12D-12D of FIG. 12A.

The configuration and manufacturing method of refrigerator housing 1c are similar to those of refrigerator door 1a, but refrigerator housing 1c takes a longer vacuum-evacuation time than refrigerator door 1a because open-cell urethane foam 4 has a larger volume in refrigerator housing 1c than in refrigerator door 1a. The vacuum-evacuation time, however, can be reduced by providing a plurality of vacuum outlets 6 as shown in FIGS. 12C and 12D and by vacuum-evacuating housing 1c concurrently through these outlets 6.

In FIGS. 12C and 12D, open-cell urethane foam 4 is perforated, along rear face 1d of refrigerator housing 1c, with the following through holes 8a: one extending vertically; three (upper, middle, and lower) extending horizontally; and two (upper and lower) extending along the depth (thickness) of refrigerator housing 1c at two (upper and lower) stepped portions 1e shown in FIG. 12C. The three through holes 8a extending horizontally lead to three (upper, middle, and lower) air hatches 10 formed at the back on the left side of outer box 2. These air hatches 10 are provided with sealing member 11. The above-mentioned one through hole 8a extending vertically leads to air hatch 10 that is formed on the outer surface of the upper stepped portion 1e of outer box 2 as shown in FIG. 12C. This air hatch 10 is also sealed with sealing member 11. The two through holes 8a extending along the depth of refrigerator housing 1c lead to the vacuum outlets 6 that are formed on the front side of inner box 3. These vacuum outlets 6 are provided with exhaust pipes 7.

Other three (upper, middle, and lower) through holes 8a extend horizontally between the right and left faces if of refrigerator housing 1c, and are respectively connected to the three (upper, middle, and lower) through holes 8a formed along rear face 1d. As shown in FIG. 12D, the (upper) through hole 8a in the left face 1f leads to the upper liquid urethane inlet 9 near the left end of rear face 1d of outer box 2. This liquid urethane inlet 9 is sealed with sealing member 11. The (middle and lower) through holes 8a in the right and left faces 1f lead to the air hatches 10 formed in rear face 1d of outer box 2. These air hatches 10 are sealed with sealing member 11.

As described above, vacuum insulation box 1 according to the present embodiment includes the same components as those of vacuum insulation box 1 according to the first embodiment. Box 1 according to the present embodiment further includes, in at least one of outer box 2 and inner box 3, the following components: liquid urethane inlet 9 through which open-cell urethane foam 4 is injected; and air hatch 10 through which air in insulation space 1b goes out during foaming. Open-cell urethane foam 4 is perforated with through passages (through holes 8a or through grooves 8b) leading to either liquid urethane inlet 9 or air hatch 10. Liquid urethane inlet 9 and air hatch 10 are sealed with sealing member 11.

Thus, open-cell urethane foam 4 perforated with the plurality of through passages (through holes 8a or through grooves 8b) has a high vacuum-evacuation efficiency, and hence has a shorter vacuum-evacuation time.

Open-cell urethane foam 4 of the present embodiment is identical in configuration to that of the first embodiment shown in FIGS. 6A to 6I.

As described above, vacuum insulation body 1 according to an aspect of the present invention includes outer box 2, inner box 3, open-cell urethane foam 4 in insulation space 1b between outer box 2 and inner box 3, and vacuum outlet 6 in at least one of outer box 2 and inner box 3. Open-cell urethane foam 4 includes a through passage (through hole 8a or through groove 8b) leading to vacuum outlet 6. Vacuum outlet 6 is sealed after insulation space 1b filled with open-cell urethane foam 4 is vacuum-evacuated.

With this configuration, the through passage (through hole 8a or through groove 8b) formed in open-cell urethane foam 4 improves the efficiency at which the internal gas is evacuated through vacuum outlet 6, and hence, to largely reduce the vacuum-evacuation time.

Vacuum insulation body 1 according to another aspect of the present invention may further include, in at least one of outer box 2 and inner box 3, liquid urethane inlet 9 through which open-cell urethane foam 4 is injected, and air hatch 10 through which air in insulation space 1b goes out during foaming. In this aspect, open-cell urethane foam 4 may be perforated with a through passage (through hole 8a or through groove 8b) leading to liquid urethane inlet 9 or air hatch 10. Liquid urethane inlet 9 and air hatch 10 may be sealed with sealing member 11.

With this configuration, open-cell urethane foam 4 is perforated with the plurality of through passages (through holes 8a or through grooves 8b) to improve the vacuum-evacuation efficiency, and hence, to further reduce the vacuum-evacuation time.

In vacuum insulation body 1 according to another aspect of the present invention, open-cell urethane foam 4 may contain a plurality of cells 47 and membranous cell film portion 42 between at least one pair of opposing cells 47. Open-cell urethane foam 4 may further contain cell framework portions 43. Each cell framework portion 43 may be connected to cell film portion 42 present between one of the at least one pair of opposing cells 47 and is further connected to the cell film portion 42 present between another of the at least one pair of opposing cells 47, and may be larger in thickness than cell film portions 42. The thickness of cell film portions 42 may correspond to the distance between one pair of opposing cells 47. Open-cell urethane foam 4 may further contain first through-holes 44 penetrating cell film portions 42, and second through-holes 45 penetrating cell framework portions 43. Cells 47 are communicated with each other through first through-holes 44 and second through-holes 45.

With this configuration, the whole open-cell urethane foam 4 including both core layer 4a and skin layer 4b is perforated with first through-holes 44 and second through-holes 45 through which cells 47 are communicated with each other. This further improves the vacuum-evacuation efficiency, and hence, further reduces the vacuum-evacuation time.

In vacuum insulation body 1 according to another aspect of the present invention, the through passages (through holes 8a) in open-cell urethane foam 4 may be formed by inserting a straight drill or a rod into open-cell urethane foam 4.

With this configuration, the through passages (through holes 8a) with a predetermined size can be formed easily.

INDUSTRIAL APPLICABILITY

As described above, the present invention provides a vacuum insulation body with a large internal volume and high insulation performance at the same time. The vacuum insulation body can be used in various applications, such as refrigerators, vending machines, hot-water containers, and other electrical devices as well as insulation materials for buildings, automobiles, and thermal boxes.

REFERENCE MARKS IN THE DRAWINGS 1 vacuum insulation body (vacuum insulation box)
1a refrigerator door
1b insulation space
1c refrigerator housing
2 outer box
3 inner box
4 open-cell urethane foam
4a core layer
4b skin layer
5 exterior part
6 vacuum outlet
7 exhaust pipe
8a through hole (through passage)
8b through groove (through passage)
9 liquid urethane inlet
10 air hatch
11 sealing member
42 cell film portion
43 cell framework portion
44 first through-hole
45 second through-hole
46 powder (fine powder)
47 cells

The invention claimed is:

1. A vacuum insulation body comprising:
an outer box;
an inner box;
open-cell urethane foam in an insulation space between the outer box and the inner box; and
a sealed vacuum outlet in one of the outer box and the inner box, wherein
a through passage which penetrates from the vacuum outlet is formed in the open-cell urethane foam,
the vacuum outlet was sealed upon the insulation space having been filled with the open-cell urethane foam and vacuum-evacuated,
the through passage includes a plurality of through holes, the plurality of through holes having at least one point at which one of the through holes joins another one of the through holes, and
the open-cell urethane foam comprises:
a plurality of cells,
a membranous cell film portion between at least one pair of opposing cells,
a cell framework portion leading to the cell film portion between one of the at least one pair of opposing cells and the cell film portion between another of the at least one pair of opposing cells, the cell framework portion being larger in thickness than the cell film portion,
a first through-hole penetrating the cell film portion, and
a second through-hole penetrating the cell framework portion, and the plurality of cells are communicated with each other through the first through-hole and the second through-hole.

2. The vacuum insulation body according to claim 1, wherein one of the outer box and the inner box comprises:
a liquid urethane inlet through which the open-cell urethane foam is injected; and
an air hatch through which air in the insulation space goes out during foaming, wherein
the open-cell urethane foam includes the through passage leading to one of the liquid urethane inlet and the air hatch, and
one of the liquid urethane inlet and the air hatch is sealed with a sealing member.

3. The vacuum insulation body according to claim 2, wherein the through passage in the open-cell urethane foam is formed by inserting a straight drill or rod into the open-cell urethane foam.

4. The vacuum insulation body according to claim 1, wherein the through passage in the open-cell urethane foam is formed by inserting a straight drill or rod into the open-cell urethane foam.

5. The vacuum insulation body according to claim 1, wherein the through passage is formed in the process of forming the open-cell urethane.

* * * * *